July 9, 1957

A. CARVER ET AL 2,798,503

LEAK-RESPONSIVE AUTOMATIC CUT-OFF VALVE
ACTUATOR FOR WATER HEATERS OR THE LIKE

Filed Sept. 21, 1953

INVENTORS.
AUBREY CARVER
BENJAMIN H. BUTLER
BY

Knox & Knox
AGENTS FOR APPLICANTS

United States Patent Office 2,798,503
Patented July 9, 1957

2,798,503

LEAK-RESPONSIVE AUTOMATIC CUT-OFF VALVE ACTUATOR FOR WATER HEATERS OR THE LIKE

Aubrey Carver, Bostonia, and Benjamin H. Butler, La Jolla, Calif.

Application September 21, 1953, Serial No. 381,254

2 Claims. (Cl. 137—67)

The present invention relates generally to a water utilizing apparatus cut-off valve actuator, and more particularly to a means of automatically actuating said valve in the event of a leak in said apparatus, together with a suitable protecting device for the actuator and a combination drip pan and mounting base.

The primary object of this invention is to provide an automatic means of shutting off the water inlet on a water utilizing apparatus in the event of leakage. The unusual and commending features of the device are its simplicity and cheapness of construction.

Another object of the device is to incorporate within its construction a minimal and inexpensive means of catching and draining the leakage water, thereby protecting the floor and other parts of the premises from damage.

Other objects are to provide that all structural and operating elements of the device shall be readily and fully accessible, in plain view at all times, and capable of repair and/or replacement without need of special tools or any particular skill.

Finally, it is an object to provide an automatic cutoff of the aforementioned character which is simple, safe and convenient to use, and which will give generally efficient and durable service.

With these and other objects definitely in view, this invention consists in the novel construction, combination and arrangement of elements and portions, as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing, and in which:

Figure 1:
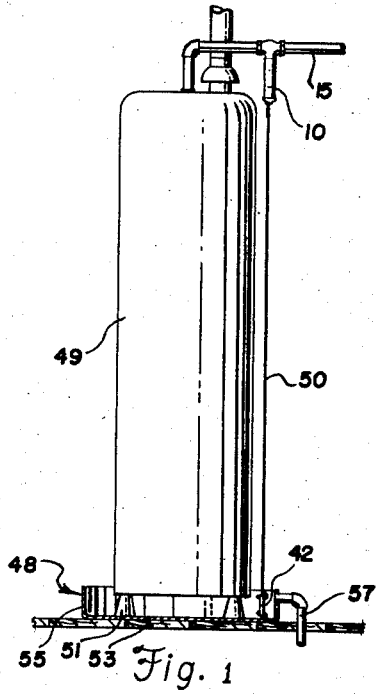
Fig. 1 is a side elevation view of the operably-installed automatic water cut-off device, together with and attached to the combination drip pan and mounting base, wherein the water utilizing apparatus may stand.
Figure 2:
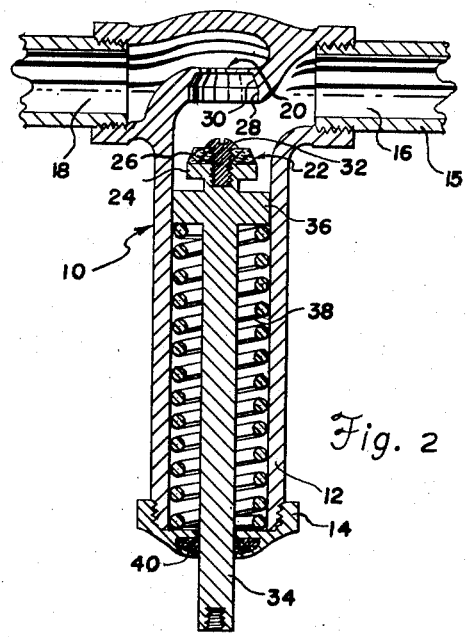
Fig. 2 is an enlarged longitudinal section through a preferred vertical plunger type of cut-off valve, mounted in the cold water intake pipe of the water utilizing apparatus.
Figure 3:
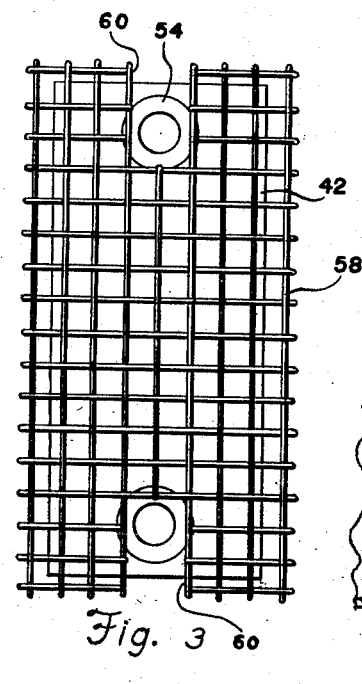
Fig. 3 is a front view of the water softenable link, with grommet-reinforced attachment apertures, the link being enveloped by its protective wire mesh.

Referring now to the drawing, in detail, the main casing of the preferred cut-off valve assembly 10 shown in Fig. 2 comprises a T-shaped valve body 12 having threaded connection with a screw cap 14. The other casing branches threadably connect into the cold water supply line 15 at intake port 16 and outlet port 18. The generally indicated annular valve seat 20 stands at the junction of the intake port 16 and the outlet port 18 within the valve body, and the seating of the generally indicated valve element 22 stops the flow of water. The valve element 22 seats in annular valve seat 20, the components of valve element 22 comprising the small annular flange 24 and the rubber annular seal 26 cooperating with the corresponding components of annular valve seat 20 which comprise the straight wall 28 and the tapered wall 30. The aforementioned valve element parts are positioned and secured to each other by the screw 32, which is tapped into the valve stem 34.

The valve element 22 rides against the inner walls of the hollow cylindrical shank part of the T-shaped valve body 12 on the circumferential surface of a large annular flange guide 36. Driving coil spring 38 is mounted coaxially of the valve stem 34 and compressed between the flat end surface of screw cap 14 and large annular flange 36, to provide the upward thrust which biases valve element 22 into sealing relationship with annular valve seat 20. Movement of the valve element 22 is normally prevented by the restraint of a cable having threaded connection to the tapped end of the stem 34. Packing gland 40 seals the opening of screw cap 14 through which the stem 34 protrudes.

Figure 4:
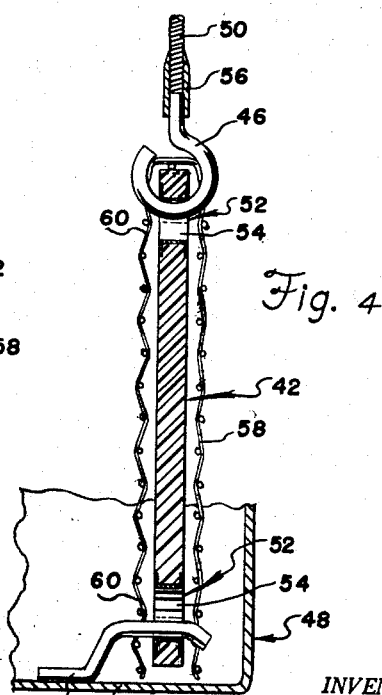
Fig. 4 is an enlarged vertical sectional view of the water-softenable link assembly operably mounted within and connected to the water-collecting drip pan at one end, and secured at its other end by the wire cable connection which actuates the aforementioned cold water intake line cut-off valve. The protecting wire mesh is shown operably resting upon and enveloping the water-softenable link.

Referring now to Fig. 4, a water-softenable link generally indicated at 42 is supported at its opposite ends by bottom hook 44 and top hook 46, which hooks attach respectively to the bottom 53 of the combination base and drip pan 48 and the cable 50. The bottom 53 of the combination element 48, as a base for the water heater 49 or other water utilizing apparatus, prevents mutilation of the floor by said apparatus, as for example by the feet 51. As a drip pan this same element 48 has a side wall 55 and serves as a catch basin for leakage water. An overflow pipe 57 is connected in the wall 55, this overflow pipe ordinarily connecting to the sewer system. The apertures 52 adjacent the opposite ends of link 42, which accommodate the aforementioned hooks, are reinforced at their edges by the grommets 54. The cable 50 is attached at one end to the top hook 46 by connector 56. A wire mesh 58 protects the relatively fragile water-softenable link 42 against accidental mechanical damage. The wire mesh is mounted upon and envelopes said link. Slots 60 adjacent the opposite edges of the wire mesh 58 register with the aforementioned grommets and permit unhindered separation of the water-softenable link 42.

Therefore, it will be seen that, upon a leak developing in the water-utilizing apparatus 49, the leakage water will collect in drip pan 48 and thus immerse the water-softenable link 42 to cause it to rupture and thereby terminate restraint upon stem 34, thus permitting the spring 38 to force valve element 22 into sealing relationship with the valve seat 20, stopping the flow of water into the water utilizing apparatus.

The operation of this invention will be clearly comprehended from a consideration of the foregoing description of the mechanical details thereof, taken in connection with the drawing and the above recited objects. It will be obvious that all said objects are simply achieved by this invention.

Further description would appear to be unnecessary.

It is understood that minor variation from the form of the invention disclosed herein may be made without departure from the spirit and scope of the invention, and that the specification and drawings are to be considered as merely illustrative rather than limiting.

We claim:

1. The combination of an inlet pipe for a water heater or the like, a drip pan to localize and contain leakage water, a cut-off valve in said inlet pipe, said valve being biased toward closed position, a water-softenable and rupturable link having attachment means at opposite ends, one of said attachment means being affixed to said pan near the bottom thereof, a cable operatively connecting said cut-off valve to the other of said attachment means and holding the valve in open position.

2. A device for use with a water-utilizing apparatus, comprising a combination drip pan and mounting base for the water-utilizing apparatus, said combination pan and base having a bottom panel and side wall structure, a cut-off valve biased to closed position for connection in the intake pipe of the water-utilizing apparatus, a water-softenable and rupturable link, said link having connection at one end with said drip pan adjacent said bottom panel, a cable connected to the other end of said link, said cable being operably connected with said cut-off valve to hold the same in open position.

References Cited in the file of this patent
UNITED STATES PATENTS

| | | |
|---|---|---|
| 852,819 | Brick | May 7, 1907 |
| 1,253,986 | Larson | Jan. 15, 1918 |
| 1,924,356 | Glab | Aug. 29, 1933 |
| 1,993,666 | Hornell | Mar. 5, 1935 |
| 2,074,554 | Myron | Mar. 23, 1937 |
| 2,347,203 | Lindsay | Apr. 25, 1944 |
| 2,625,166 | Lindsay | Jan. 13, 1953 |